Dec. 29, 1925.
J. A. SCHMIDT
TRACTOR STEERING DEVICE
Filed July 2, 1925
1,567,469
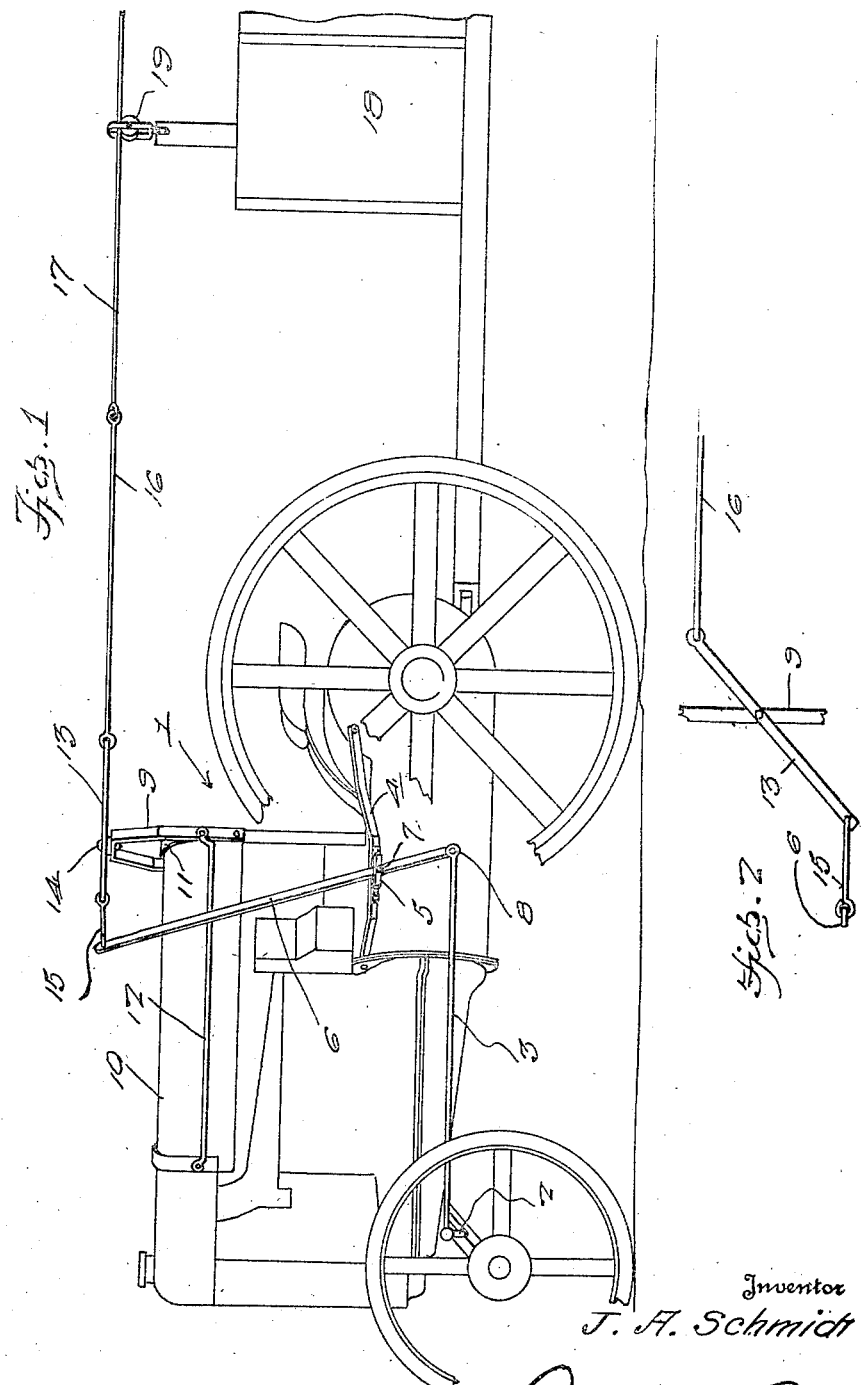

Patented Dec. 29, 1925.

1,567,469

UNITED STATES PATENT OFFICE.

JOHN A. SCHMIDT, OF ENID, OKLAHOMA.

TRACTOR STEERING DEVICE.

Application filed July 2, 1925. Serial No. 41,129.

*To all whom it may concern:*

Be it known that I, JOHN A. SCHMIDT, a citizen of the United States, residing at Enid, in the county of Garfield and State of Oklahoma, have invented certain new and useful Improvements in Tractor Steering Devices, of which the following is a specification.

This invention relates to improvements in steering devices, and is more particularly adapted to one for use in connection with a tractor, whereby the steering of the tractor may be controlled from an agricultural implement or other vehicle, attached to the rear of the tractor.

A further object of the invention is to provide a tractor steering device of the above mentioned character, which is of such a construction as to enable it to be readily and easily installed, without necessitating any material alterations to the tractor.

A still further object is to provide a tractor steering device of the above mentioned character, which will at all times be positive and efficient in its operation, the same being further simple in construction, strong and durable, and otherwise well adapted for the purpose for which it is designed.

Other objects and advantages of the invention will become apparent during the course of the following detailed description:

In the accompanying drawing, forming a part of this application, and in which like reference characters designate corresponding parts throughout the same:

Figure 1 is a side elevation of a tractor of the Fordson type, showing my improved steering device, mounted thereon, and Figure 2 is a top plan view of the cross bar and the supporting bracket therefor.

In the drawing, wherein for the purpose of illustration is shown the preferred embodiment of my invention, the numeral 1 designates generally a tractor of the Fordson type, the steering gear thereof being indicated generally by the numeral 2. The usual drag link, which is associated with the steering gear is illustrated at 3. A bracket 4 is secured at its respective ends on the side of the tractor adjacent the rear portion thereof, the bracket being in the form of a strap iron. The auxiliary bracket 5 is secured on the bracket 4 and is also in the form of a strap iron, the intermediate portion of the auxiliary bracket being spaced from the main bracket 4.

An elongated lever 6 extends vertically through the spaced bracket and is pivotally supported between the strap irons 4 and 5, as illustrated at 7. The lower end of the lever 6 is pivotally connected to the rear end of the steering drag link 3 as shown at 8.

A substantially inverted U-shaped bracket 9 straddles the rear portion of the fuel tank 10 of the tractor 1, the arms of the inverted U-shaped bracket being secured to the band 11, which encircles the rear portion of the fuel tank as clearly illustrated in Figure 1. Suitable bracing means, such as is shown at 12, is associated with the inverted U-shaped bracket 9 and the fuel tank 10.

A horizontally disposed cross bar 13 is pivotally supported, intermediate its ends on the crown portion of the inverted U-shaped bracket 9 as illustrated at 14. A short rod or link 15 affords a connection between one end of the cross bar 13 and the upper end of the lever 6. The ends of the rod are provided with eye portions for attaching the rod and as is clearly shown, the eyes are disposed at right angles to each other. Attached to the opposite end of the horizontally disposed cross bar 13 is the actuating means, which is, in the present case, a pair of interconnected rods 16, and 17. These rods extend rearwardly from the tractor to the implement or vehicle which is attached to the rear of the tractor and is designated by the numeral 18. A guide pulley 19 as arranged on the implement or vehicle, and the rod 17 extends thereover, in the manner as illustrated in Figure 1.

The operator who is seated on the implement or vehicle attached to the rear of the tractor, by actuating the rods 16 and 17 will cause the horizontally disposed cross bar 13 to swing on its pivot 14, simultaneously causing the forward or rearward movement of the lever 6, depending upon the direction in which the cross rod turns, and as a result operating the steering gear of the tractor. This enables the operator of the agricultural implement or vehicle to control the steering of the tractor from a point remote therefrom, in a simple and efficient manner. The provision of a steering device of the above mentioned character may be easily and readily installed on a tractor, without materially altering the same, and when the steering device, embodying the present invention is not used, the same may be detached, and the tractor steered in the usual manner.

While I have shown the preferred embodiment of the invention, it is to be understood that various changes in the size, shape, and arrangement of parts, may be resorted to, without departing from the spirit of the invention or the scope of the appended claims.

Having thus described my invention, what I claim as new is:

1. A tractor steering device, comprising in combination with the usual drag link of a tractor steering gear, a vertically disposed lever pivotally supported adjacent its lower end on the side of the tractor, the lower end of said lever being connected to the rear end of the drag link, a bracket straddling the rear portion of the fuel tank, a horizontally disposed cross bar pivotally supported intermediate its ends on said bracket, one end of said cross bar being connected to the upper end of the vertically disposed lever, and an actuating means associated with the opposite end of the cross bar, said actuating means extending rearwardly from the tractor and being controlled from a point remote thereof.

2. A tractor steering device, comprising in combination with the usual drag link of a tractor steering gear, a vertically disposed lever pivotally supported adjacent its lower end on the side of the rear portion of the tractor, the lower end of said lever being connected to the rear end of the drag link, a substantially inverted U-shaped bracket straddling the rear portion of the fuel tank of the tractor, a horizontally disposed cross bar pivotally supported intermediate its ends on the crown portion of the inverted U-shaped bracket, one end of the cross bar being connected to the upper end of said lever, and an actuating rod connected to the other end of the cross bar and adapted to be controlled from a point remote from the tractor.

3. A tractor steering device, comprising in combination with the usual drag link of a tractor steering gear, a bracket secured on the side of the rear portion of the tractor, an elongated vertically disposed lever pivotally supported adjacent its lower end on said bracket, the lower end of said lever being connected to the rear end of the drag link, a substantially inverted U-shaped bracket straddling the rear portion of the fuel tank of the tractor, a horizontally disposed cross bar pivotally supported intermediate its ends on the crown portion of the inverted U-shaped bracket, a rod connecting one end of the cross bar with the upper end of the lever, and means for actuating the cross bar from an implement attached to the rear of the tractor.

In testimony whereof I affix my signature.

JOHN A. SCHMIDT.